Figure 1:
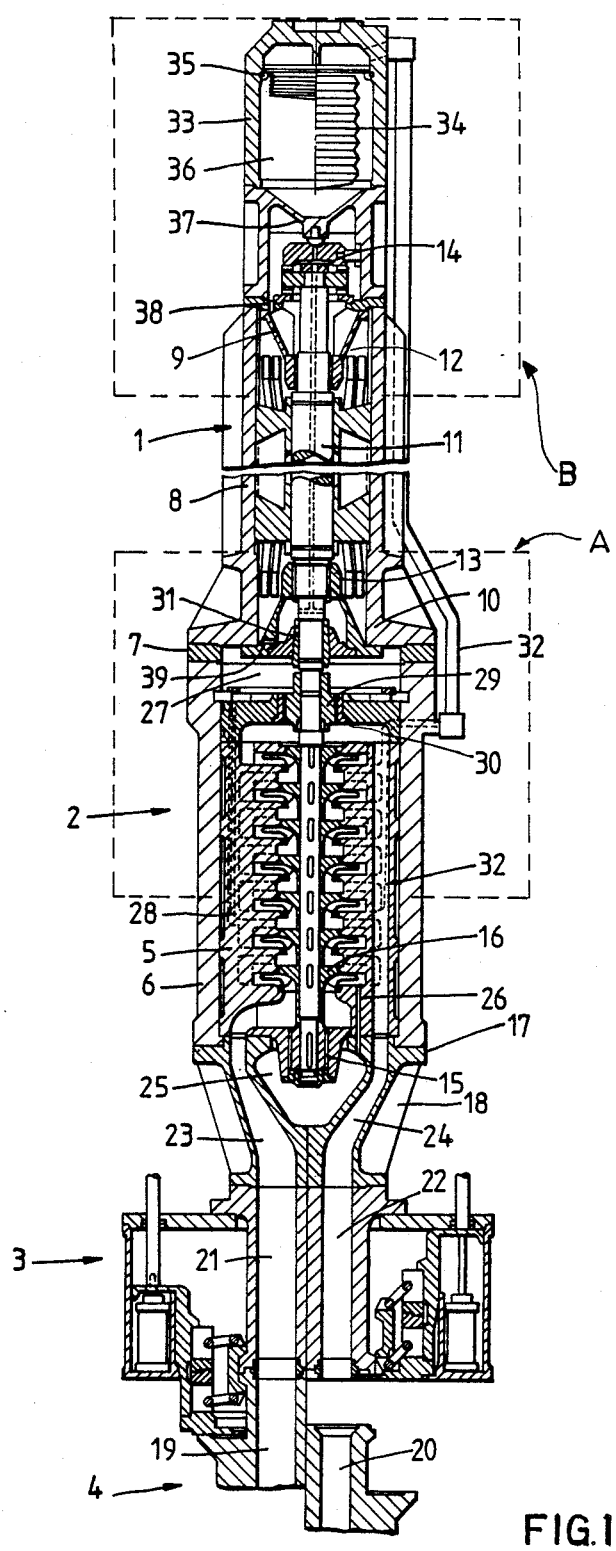

United States Patent [19]

Christensen

[11] Patent Number: 4,932,848
[45] Date of Patent: Jun. 12, 1990

[54] PUMP UNIT
[75] Inventor: Jan S. Christensen, Oslo, Norway
[73] Assignee: Kvaerner-Eureka A/S, Tranby, Norway
[21] Appl. No.: 259,149
[22] Filed: Oct. 18, 1988
[30] Foreign Application Priority Data
Oct. 26, 1987 [NO] Norway .................................. 874455
[51] Int. Cl.⁵ ................................................. F04D 1/00
[52] U.S. Cl. ................................. 417/414; 417/423.13; 417/423.14; 417/368
[58] Field of Search ........... 417/423.3, 423.12, 423.13, 417/424.1, 423.14, 372, 368, 414

[56] References Cited
U.S. PATENT DOCUMENTS

| 1,974,678 | 9/1934 | LaFont | 417/423.12 |
| 2,406,947 | 9/1946 | Harlamoff | |
| 2,674,194 | 4/1954 | Arutunoff | 417/423.3 |
| 2,682,229 | 6/1954 | Luenberger | 417/423.3 |
| 3,694,110 | 9/1972 | Guinard | 417/423.3 |
| 3,764,236 | 10/1973 | Carter | 417/423.12 |
| 3,975,117 | 8/1976 | Carter | 417/423.12 |

Primary Examiner—Leonard E. Smith
Assistant Examiner—D. Scheuermann
Attorney, Agent, or Firm—Young & Thompson

[57] ABSTRACT

The invention relates to a pump unit comprising a liquid filled electric motor with a house and with a vertical driving shaft extending downwards, a pump comprising a pump house, and a pump portion which is connected with a driving shaft, and a chamber around said driving shaft, between the motor and the pump with a mechanical packing between motor and chamber. The pump unit is characterized by the fact that the motor house and the pump house are combined to a press shell which is closed to the ouside. The chamber has a pressure equalizing connection with a first place in the pump. The liquid filled motor house has a pressure equalizing connection with a second place in the said pump where the pressure is higher than at said first place.

6 Claims, 3 Drawing Sheets

PUMP UNIT

The invention relates to a pump unit.

The invention was especially developed in connection with a demand for being able to pump a well flow from offshore oil fields to the shore. Transport of non-processed well flow across great distances to land based processing plants offers great potential profit. By placing as much as possible of the heavy and bulky processing plant on land, there is more choice as regards an optimal design, since limitations of weight and space are not the same as on a fixed or especially a floating rig.

For conveying a well flow across long distances to the shore or to existing processing rigs having free capacity at some distance subsea pumping stations will be required. There are several advantages to be gained if such stations are placed on the sea floor. Compressors and pumps will sit in the middle of a coolant (sea water) keeping a substantially constant temperature. Any hazards of explosion are eliminated and the plant will be unaffected by wind, and weather and icing. Expenses will be greatly reduced in connection with rig costs, quartering costs, and transport of operators and equipment to and from land.

However, subsea pumping stations are originally burdened with certain disadvantages and unsolved problems. Simple daily checks and maintenance work will, thus, not be possible. Systems and components for control and monitoring remote subsea stations constitute an untried technology. Necessary electric power has to be transmitted across great distances, and the connection with equipment in the subsea station must be established in a satisfactory manner.

Any equipment, and all components must be high quality and highly reliable. Maintenance must be organized according to fixed systems permitting replacement of equipment.

As mentioned, the invention was especially developed in connection with the demand for a subsea pumping station which is able to pump a well flow from the field to a receiving plant on land or on an adjacent rig. In this connection it would be desirable to have a pump unit that may be readily mounted and dismantled on the sea floor. Mounting and dismantling operations should be carried out by the aid of unattended diving vessels and/or elevator means controlled from the surface. Service/maintenance to occur in connection with complete units should be carried out with desired intervals of at least one to two years. Time based control and adjustments should be kept at a minimum, and it should, preferably, be possible to dispense with monitoring the pump in operation.

By the invention a pump unit is achieved which may, as such, be relatively readily be mounted or dismantled, respectively, on the sea floor, i.e. at a subsea station for production or conveyance by pumping of hydrocarbons. Service/maintenance is only required at large intervals (one to two years). According to the invention this is achieved by a pump unit as stated in claim 1 with the features stated in the characterizing part of the claim.

Further features of the invention are stated in the dependent claims.

By having the motor housing and pump housing combined into a pressure shell which is closed towards the outside a pump unit is achieved which can sit on the sea floor and may be replaced as a unit, when necessary.

The pressure equalizing connections provide a defined leakage path so that the well flow is prevented from penetrating the motor.

An embodiment in which the pressure equalizing connection with the motor housing filled with liquid comprises a liquid chamber provided above the motor, and with a parting bellows means provided between the liquid in said chamber and a chamber portion which is in fluid connection with a place in the pump is advantageous, because a desired pressure equalization and a defined leakage path are achieved without any hazard of the transport medium (well flow), and the liquid filling of the motor (water) mixing. At the same time a reservoir is provided which, e.g. may comprise a sufficient liquid reserve for 10,000 hours (two years) of operation with normal leakage through the mechanical packing (with a good safety margin).

It is advantageous to have the driving shaft mounted in three bearings, two of which are main bearings in the electric motor and one is a less loaded auxiliary bearing in the pump, because this permits liquid lubrication of both motor bearings and transport medium or well flow lubrication of the bearing in the pump. In short pumps the auxiliary bearing may be omitted, if desired.

The well flow lubricated bearing is further secured by being connected with a lubricant reservoir which is in fluid connection with a pressurized place in the pump.

An advantageous embodiment of the pump comprises a vertical multistage centrifugal pump, preferably, in combination with a water filled electric motor.

Figure 2:
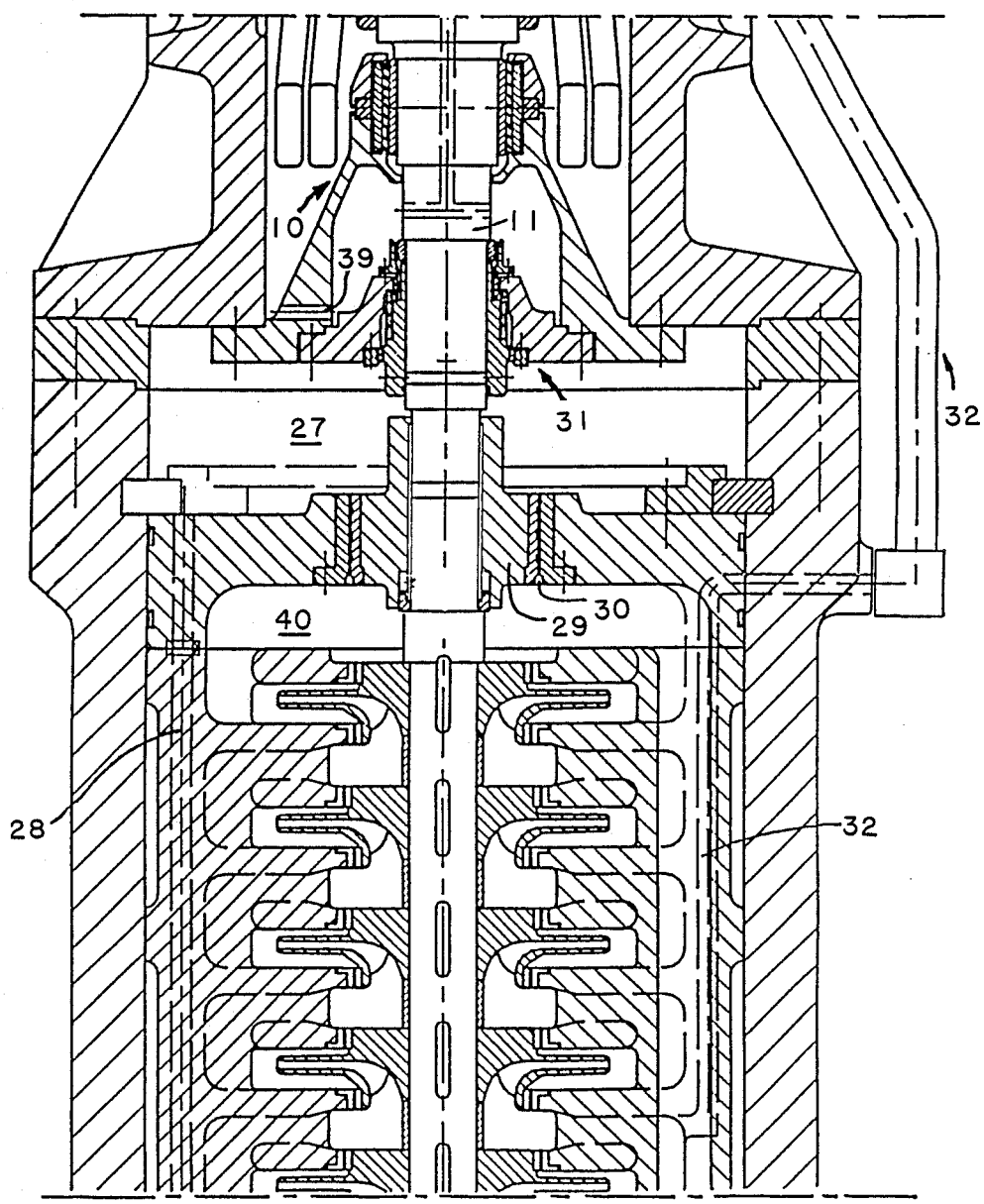
Figure 3:
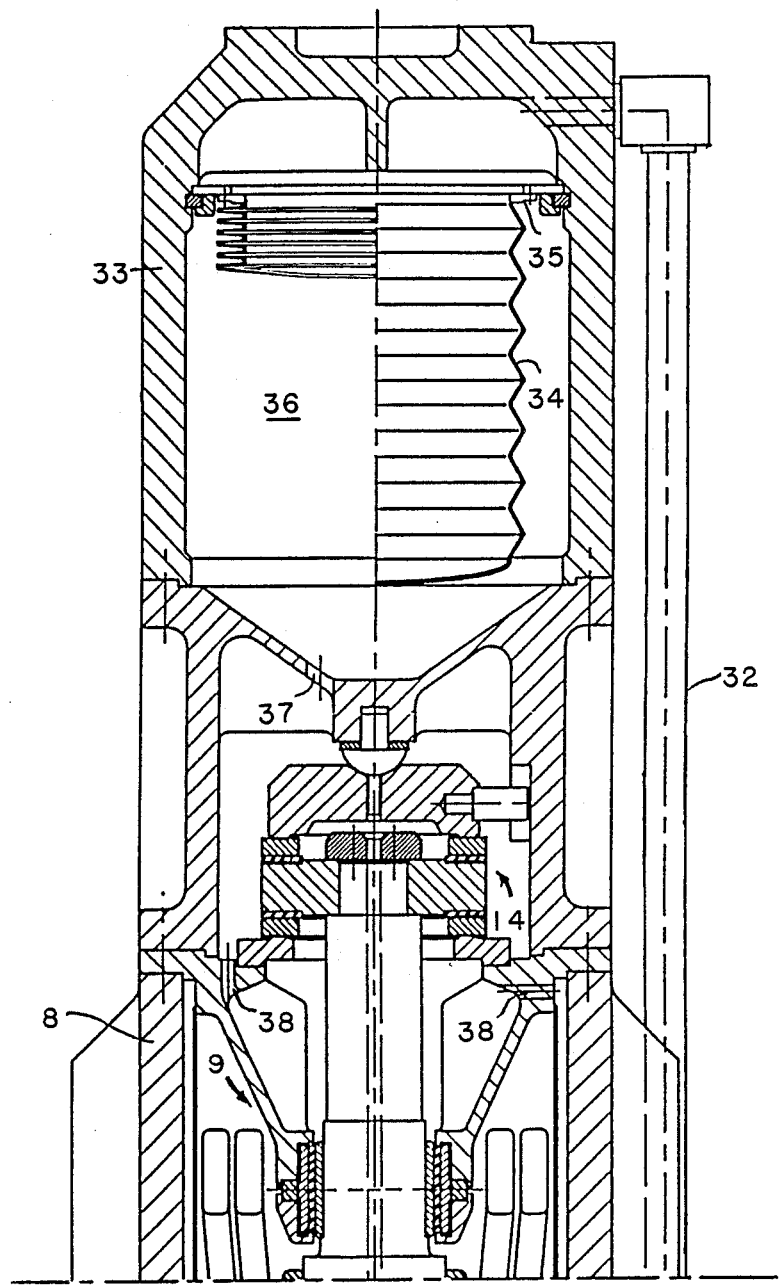

The invention is disclosed in more detail below with reference to the drawings which show a sectional view of a preferred embodiment. FIGS. 2 and 3 are detailed views of the regions labelled A and B, respectively, in FIG. 1.

In the sectional view of the drawing a pump unit is shown which comprises a water filled electric motor 1, a multistage centrifugal pump 2 and a connector 3, intended for connection with an indicated well head 4. The well head is only intended to be an example, since it may, e.g. be a question of a manifold/fluid pipe from a subsea separator for oil and gas.

Pump 2 mainly comprises a pump housing 5 which is provided in an external pump housing 6. Said external pump housing 6 is flanged at 7 to a housing 8 of motor 1.

In motor housing 8 a bearing insert 9 is provided uppermost, and a lower bearing insert 10 is provided lowermost. The drive shaft 11 of the motor is mounted on water lubricated bearings 12, 13 in the respective bearing inserts 9, 10. The upper end of drive shaft 11 is at 14 mounted in an axial bearing. The drive shaft extends down through pump 2 and is at its lower end mounted in a well flow lubricated bearing 15. The pump rotor is mounted on the drive shaft. As shown, the pump rotor comprises a number of runners, and centrifugal pump 2, this, has seven stages.

At its lower end, at 17, pump 2 is flanged to a combined inlet/outlet housing 18 which is, in turn, connected with connector 3.

In the left half of the drawing connector 3 is shown connected with a well head 4 or a supply pipeline. In the right hand half the pump unit is shown in a position with connector 3 not yet connected with well head 4.

Well head 4 has a well flow passage 19 and a well flow passage 20. Corresponding passages 21, 22 are to be found in connector 3. In housing 18 a corresponding passage 23 is provided to act as an inlet for centrifugal pump 2, and a passage 24 is provided to form an outlet from pump 2. In housing 18, furthermore, a chamber 25 is formed to be a reservoir of a well flow volume to lubricate bearing 15. Said chamber 25 is, via a channel 26 in fluid connection with the first stage of the centrifugal pump.

A pressure reduction chamber 27 is provided between the pump and the motor. As shown, it surrounds driving shaft 11 and is in fluid communication with the second stage of the centrifugal pump, via channel 28, shown in dashed lines, in pump housing 5. At the spot where driving shaft 11 passes out of the upper end of pump housing 5 a press plunger 29 is provided to reduce transmission of axial thrust to the electric motor. For this reason throttling 30 is provided towards pressure reduction chamber 27. Driving shaft 11 is sealed against the pressure reduction chamber by a mechanical packing 31.

From the third stage of the centrifugal pump a pressure equalizing conduit 32 in this embodiment extends up to upper casing 33 which forms a pressure equalizing tank and a leakage reservoir.

In upper casing 33, a variable volume is, thus, provided shown here as a bellows means 34 which is firmly and tightly clamped into casing 33 at its upper edge 35. Conduit 32 opens uppermost in casing 33, and opens inside bellows means 34, as shown. Bellows means 34 is shown in a collapsed position in the left hand side of the figure and in its fully expanded position in the right hand side of the figure. There is a space 36 which is filled up with water around bellows means 34 in casing 33. By the aid of one or several openings 37 said space communicates with the interior of the electromotor which is also filled with water. In upper bearing insert 9 there is one or a number of openings 38. One or a plurality of openings 39 are also provided in lower bearing insert 10.

In the shown and described embodiment the mechanical packing 31 will have a defined leakage path from the motor towards pressure reduction chamber 27 and pump 22. In this embodiment the second and third pump stages are utilized for the desired pressure equalization and definition of the leakage path, but the invention is obviously not limited to utilization of said two pump stages. The essential feature is that such pressure equalization is provided by suitable pressure outlets from the pump, so that, via a mechanical packing 31, a desired and preferably very slight pressure gradient is achieved from the water filled electromotor 1 and towards centrifugal pump 2.

Space 36 is advantageously dimensioned to be able to contain enough water, e.g. for two years of normal operation, i.e. normal leakage through the mechanical packing 31 plus a necessary safety margin. In this connection it should be mentioned that for a mechanical packing, naturally a mechanical packing is used which is practically described as a zero-leakage packing. There are various packings of this kind on the market and they will be known to those skilled in the art.

In operation, the disclosed device is coupled to the well head 4. The water-filled electric motor 1 is started. The pump receives or takes liquid through the inlet 23. From the upper part of the pump (i.e., from the last stage or pump wheel), a passage 40 runs downward to the outlet 24. A pressure reduction chamber 27 is provided between the pump and the motor. The pressure reduction chamber 27 is in fluid communication with a second stage of the centrifugal pump through a channel 28. An annular piston 29 is provided around the shaft between the pressure reduction chamber 27 and the upper chamber 40 in the pump. A throttling between this upper chamber 40, which has the pressure of pump stage 7, and the pressure reduction chamber 27, is provided in an annular passage around the piston 29. From the third stage of the pump a pressure equalizing conduit 32 extends up to the upper casing 33 and opens into a bellows 34 arranged in the upper casing 33. Thus, a desired pressure gradient is achieved from the water-filled electric motor 1 and towards the centrifugal pump 2.

Having described my invention, I claim:

1. A pump unit comprising
   a liquid-filled electric motor contained within a housing, said motor connected to a drive shaft which extends from said housing;
   a pump contained within a housing, said pump connected to said drive shaft;
   said drive shaft contained within an annular chamber which surrounds said drive shaft and extends between said motor and said pump, and packing means between said motor and said annular chamber;
   said motor housing and said pump housing being interconnected to form an integrated unit,
   first pressure equalizing means between said annular chamber and a first portion of said pump; and
   second pressure equalizing means between said liquid-filled electric motor and a second portion of said pump having a higher pressure than that exhibited by said first portion of said pump.

2. The pump of claim 1, wherein said second pressure equalizing means comprises a liquid-filled space adjacent said motor and a chamber in said space of variable volume which is in fluid communication with said second portion of said pump.

3. The pump of claim 2, wherein said chamber of variable volume is formed by a partitioning bellows means between said liquid in said space and said fluid connection with said second portion of said pump.

4. The pump of claim 1, wherein said drive shaft includes three bearings, two of said bearings being in said motor and one of said bearings being in said pump.

5. The pump of claim 1, wherein one end of said drive shaft is mounted within said pump housing by means of a lubricated bearing, said bearing being connected with a lubricant reservoir which is in fluid communication with a pressurized portion of said pump.

6. The pump of claim 1, wherein said pump comprises a vertically-oriented multistage centrifugal pump.

* * * * *